Figure 1:
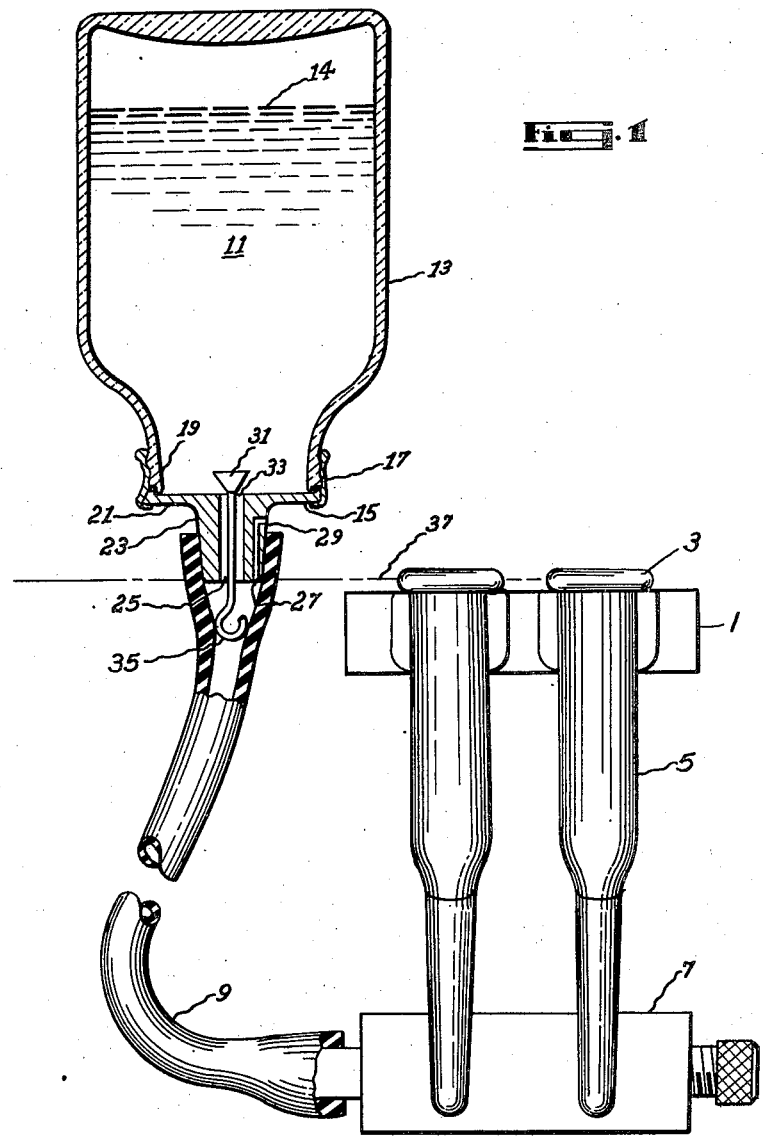

May 18, 1948.  J. L. FAIR  2,441,878
STERILIZING ARRANGEMENT FOR MILK TUBES
Filed Nov. 22, 1944  2 Sheets-Sheet 1

INVENTOR
John Lowther Fair
by C. Harold Riches
ATTORNEY

May 18, 1948.  J. L. FAIR  2,441,878
STERILIZING ARRANGEMENT FOR MILK TUBES
Filed Nov. 22, 1944  2 Sheets-Sheet 2
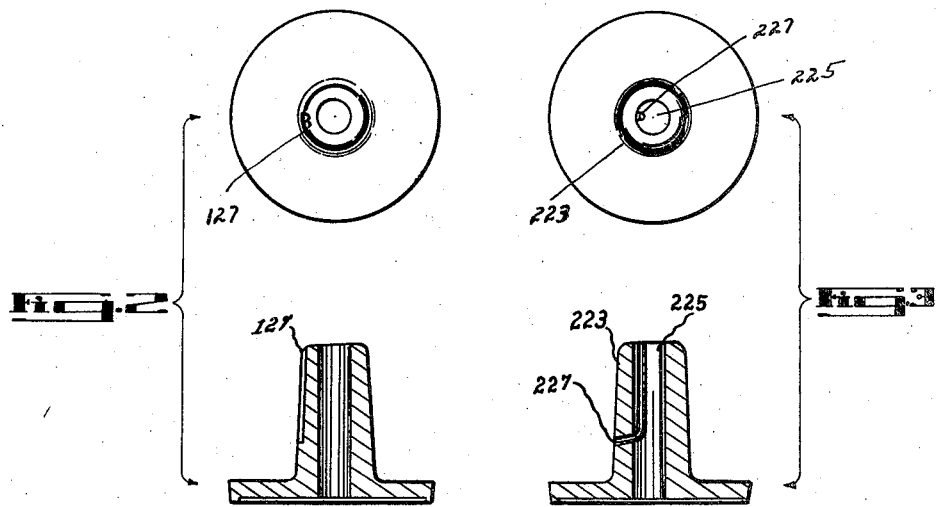
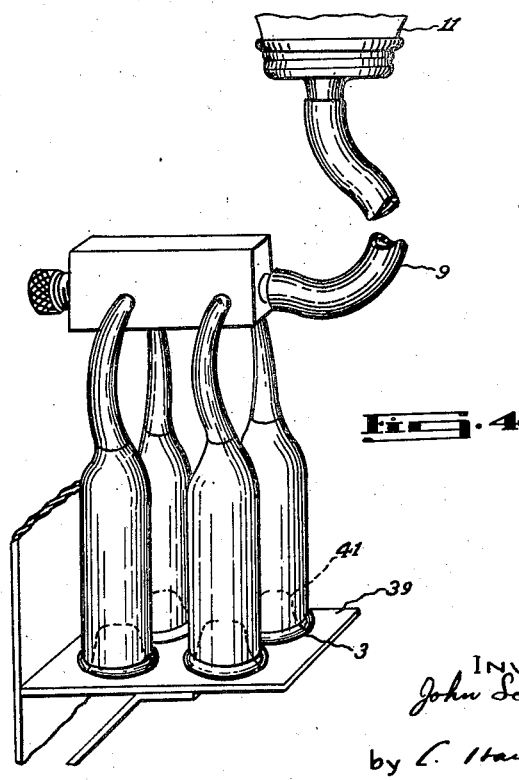

Patented May 18, 1948

2,441,878

UNITED STATES PATENT OFFICE 2,441,878

STERILIZING ARRANGEMENT FOR MILK TUBES

John L. Fair, Guelph, Ontario, Canada, assignor to The W. C. Wood Company Limited, Guelph, Ontario, Canada, a company of the Province of Ontario Application November 22, 1944, Serial No. 564,593

3 Claims. (Cl. 21—32)

My invention relates to sterilizing arrangements for the milk tubes of milking machines and particularly to novel arrangements for automatically filling the milk tubes with a sterilizing fluid, and supporting them in suitable position.

Modern dairying practice requires that rubber and metal parts be kept sterile when not actually in use, by maintaining a bacteria inhibiting fluid in contact with the milk contacting surfaces thereof and further that the fluid be used only once. To achieve this, it is customary to support the milk tubes in a suitable position and fill them with the fluid, by manual or automatic means, and empty it out when it is desired to use the tubes. An example of an automatic arrangement is disclosed in the U. S. Patent 1,803,319 to Beckman.

It is the object of the invention to introduce the fluid automatically to the milk tubes directly from a closed container, thus avoiding transferring it to an open intermediate vessel such as a pitcher for example, eliminating the need for funnels, filling pipes and so forth, and preventing contamination thereof by any foreign matter.

In describing the invention, references will be made to the attached drawings in which Fig. 1 is a diagram partly in section illustrating an embodiment of the invention; Figs. 2 and 3 show certain modifications of one of the details; and Fig. 4 shows a second embodiment of the invention.

Referring to Fig. 1, the sterilizing arrangement comprises a rack 1 for supporting the rubber inflations 3 which form liners for the metal inflation shells 5, and extend therethrough and are connected to claw 7. The milk tube 9 is attached to the claw 7 and extends to the fluid dispenser 11 and is attached thereto as indicated.

The dispenser 11 comprises a vessel 13, which may be of transparent material such as glass, supported in an inverted position by suitable means (not shown) and provided with a removable closure 15. The closure is retained by means of a threaded ring 17 and leakage of fluid is prevented by the gasket 19.

The closure comprises the flange 21 and nipple 23, the latter being provided with a large bore 25, and the wall so formed having a second bore 27 which connects to the atmosphere at 29.

The closure 15 has assembled therein a valve arrangement comprising a head 31, with a stem 33 attached thereto at its top end. The stem 33 is formed at the bottom end into an operating member or loop 35 whose diameter exceeds the normal inside diameter of the tube 9. In practice it may be expedient to make the diameter of this loop just equal to or slightly greater than the outside diameter of the nipple 23.

In practice the dispenser 11 may be secured in the inverted position shown, in such a way that the lower end of the nipple 23 is at a level just below the tops of the inflations 3 as supported by the rack 1. The dispenser is removed from its support and is filled with fluid 14, by removing threaded ring 17. When the dispenser is placed in its support in the inverted position, the valve head 31 and stem 33 fall by the force of gravity to a position to close the bore 25. It is unnecessary that the head 31 seal the bore 25 as the fluid will be prevented from running out as long as the head 31 does not leave an opening large enough to admit an air bubble.

To operate the apparatus the milk tube and inflation assembly is supported in the rack 1. The free end of the milk tube 9 is then pushed over the dispenser closure nipple 23 substantially to the position indicated, and is retained thereon by the elasticity of the tube. Since the operating member 35 has a diameter greater than the inside diameter of tube 9, the inside surface of the tube pushes 35 upwards, thus raising the valve head 31 and opening the bore 25 to the interior of the vessel 13. The fluid 14 now flows into the tube 9. Once the bore of the tube 9 is filled with fluid even for a short length, no more atmospheric air may be admitted by this route to release more fluid from 13. The bore 27 now functions to admit air from the atmosphere to the unfilled space in tube 9 and allow further fluid to be released from 13. The fluid gradually fills the tube system until it reaches the lever 37. At this point the fluid closes the lower end of the bore 27, and prevents admission of further air and release of further fluid from vessel 13. (The milk tube 9 and inflations are now filled with fluid to the level indicated and cannot be overflowed provided 11 is located as explained.)

When it is desired to use the milk tubes again, the tube 9 is pulled off the nipple 23 and the fluid allowed to drain out. The action of removing the tube pulls the operating member 35 downwards and moves head 31 to a position closing communication between the bore 25 and the vessel 13. This operation may be repeated until the supply of fluid is exhausted.

The form of the closure 15 may be as indicated in Fig. 1 or it may be modified slightly as indicated in Fig. 2, wherein the bore 27 is replaced by a groove 127 of any desired cross-section. This groove in combination with the inside surface on the milk tube 9 forms a passage and functions in the same way as bore 27. Or it may be modified as shown in Figure 3, wherein the bore 27 is replaced by a tube 227 passing through the wall of the nipple 223 into the bore 225 and extending along the side thereof to its end as shown.

Figure 4 shows a second arrangement for supporting the inflations and comprises essentially a supporting plate 39 having formed on the upper surface thereof a set of four frusto-conical projections 41—over which the open ends of the inflations 3 may be placed. The projections act as stoppers for the inflations and prevent the sterilizing fluid from leaking out. The manner of connection to the dispenser 11 is the same as shown in Fig. 1. This arrangement has the advantage that no levelling of 11 with respect to the supporting plate 9 is necessary. It also has a further advantage that the fluid in the tubes is not exposed to the atmosphere, thus preventing its pollution by dust or insects.

In the claims the assembly of inflations, claw, and milk tube may, for convenience, be referred to as a milk tube or milk tubes.

Having regard to the foregoing disclosure, I claim as my invention:

1. In a sterilizing apparatus for milk tube, an automatic fluid dispenser comprising a vessel, a closure therefor, an extension on said closure having a passage communicating with the interior of said vessel and adapted to have attached thereto in fluid receiving relation a milk tube, valve means in said passage operative by said tube as it is attached to or removed from said extension to respectively open or close said valve and an air duct associated with said tubular extension establishing communication between said passage and the atmosphere during the filling of the milk tube.

2. In a sterilizing apparatus for milk tube, an automatic fluid dispenser comprising a vessel, a closure therefor, an extension on said closure having a passage communicating with the interior of said vessel and adapted to have attached thereto in fluid receiving relation a milk tube, valve means in said passage, a stem carried by said valve adapted to be engaged by and disengaged from said tube as it is attached to or removed from said extension to respectively open and close said valve and an air duct associated with said tubular extension establishing communication between said passage and the atmosphere during the filling of the milk tube.

3. In a sterilizing apparatus for milk tube, an automatic fluid dispenser comprising a vessel, a closure therefor, an extension on said closure having a passage communicating with the interior of said vessel and adapted to have attached thereto in fluid receiving relation a milk tube, valve means in said passage operative by said tube as it is attached to or removed from said extension to respectively open or close said valve and an air duct associated with said tubular extension establishing communication between said passage and the atmosphere during the filling of said tube, the outlet of said duct being located substantially at the tube receiving end of said extension.

JOHN L. FAIR.

REFERENCES CITED

The following references are of record in the file of this patent:

UNITED STATES PATENTS

| Number | Name | Date |
| --- | --- | --- |
| 959,970 | Thornton | May 31, 1910 |
| 1,555,031 | Sharples | Sept. 29, 1925 |
| 1,258,902 | Hoffman | Mar. 12, 1918 |
| 1,803,319 | Beckman | May 5, 1931 |